US010683749B2

(12) United States Patent
Pope et al.

(10) Patent No.: US 10,683,749 B2
(45) Date of Patent: Jun. 16, 2020

(54) COAL SEAM GAS PRODUCTION DETERMINATION

(71) Applicant: GAS SENSING TECHNOLOGY CORP., Laramie, WY (US)

(72) Inventors: John Pope, Laramie, WY (US); Quentin Morgan, Brisbane (AU)

(73) Assignee: GAS SENSING TECHNOLOGY CORP., Laramie, WY (US)

( * ) Notice: Subject to any disclaimer, the term of this patent is extended or adjusted under 35 U.S.C. 154(b) by 159 days.

(21) Appl. No.: 15/741,066

(22) PCT Filed: Jul. 1, 2016

(86) PCT No.: PCT/US2016/040866
§ 371 (c)(1),
(2) Date: Dec. 29, 2017

(87) PCT Pub. No.: WO2017/007732
PCT Pub. Date: Jan. 12, 2017

(65) Prior Publication Data
US 2018/0195384 A1    Jul. 12, 2018

Related U.S. Application Data

(60) Provisional application No. 62/190,429, filed on Jul. 9, 2015, provisional application No. 62/188,596, filed on Jul. 3, 2015.

(51) Int. Cl.
*E21B 47/06* (2012.01)
*E21B 49/00* (2006.01)
(Continued)

(52) U.S. Cl.
CPC .......... *E21B 49/087* (2013.01); *E21B 43/006* (2013.01); *E21B 43/121* (2013.01);
(Continued)

(58) Field of Classification Search
CPC ...... E21B 49/00; E21B 49/087; E21B 47/102; E21B 47/06
See application file for complete search history.

(56) References Cited

U.S. PATENT DOCUMENTS 6,678,050 B2    1/2004  Pope et al.
7,821,635 B2 *  10/2010 Pope ........................ G01J 3/28
                                                         356/326
(Continued)

OTHER PUBLICATIONS

International Search Report and Written Opinion issued in PCT/US2016/040866, dated Sep. 23, 2016, 8 pages.

*Primary Examiner* — Catherine Loikith
(74) *Attorney, Agent, or Firm* — Adolph Locklar

(57) ABSTRACT

A coal seam producibility determination system may include a fiber optic cable, the fiber optic extending from a DAS interrogation unit into a wellbore. The DAS interrogation unit may be located at a surface. The wellbore may intersect a plurality of coal seams to be measured, the coal seams comprising fluid and solubilized gas. The wellbore contains wellbore fluid and the wellbore has a wall. The fiber optic cable extends along the plurality of coal seams. The coal seam producibility determination system may further include a spectrometer, the spectrometer located at the surface or within the wellbore. The coal seam producibility determination system may also include an optical window, the optical window in optical communication with the spectrometer, the optical window in fluid communication with the wellbore fluid.

9 Claims, 15 Drawing Sheets

(51) Int. Cl.
*E21B 49/08* (2006.01)
*E21B 47/10* (2012.01)
*E21B 43/12* (2006.01)
*E21B 43/00* (2006.01)
*G01N 21/65* (2006.01)
*E21B 33/12* (2006.01)
*E21B 43/08* (2006.01)

(52) U.S. Cl.
CPC ............ *E21B 43/123* (2013.01); *E21B 47/06* (2013.01); *E21B 47/10* (2013.01); *G01N 21/65* (2013.01); *E21B 33/12* (2013.01); *E21B 43/086* (2013.01); *E21B 2049/085* (2013.01)

(56) References Cited

U.S. PATENT DOCUMENTS

| | | |
|---|---|---|
| 8,256,282 B2 | 9/2012 | Schlachter |
| 8,640,771 B2 | 2/2014 | Pope et al. |
| 8,867,040 B2 * | 10/2014 | Pope .................. E21B 43/006 166/250.01 |
| 2003/0159828 A1 | 8/2003 | Howard et al. |
| 2009/0153845 A1 | 6/2009 | DiFoggio |
| 2014/0163889 A1 | 6/2014 | Finfer et al. |
| 2014/0246574 A1 | 9/2014 | Pope et al. |

* cited by examiner

COAL SEAM GAS PRODUCTION DETERMINATION

CROSS-REFERENCE TO RELATED APPLICATIONS

This application is a National Stage Entry of PCT/US2016/040866, filed Jul. 1, 2016; which itself claims priority from U.S. provisional application No. 62/188,596, filed Jul. 3, 2015, and 62/190,429, filed Jul. 9, 2015, which are incorporated by reference in their entirety.

FIELD OF THE DISCLOSURE

The present disclosure relates to determining coal seam water or gas production within a well.

BACKGROUND

Wells for production of coal seam gas may be completed across multiple coal seams using open hole techniques or a completion structure, such as a slotted or perforated liner. Traditionally, for wells completed with a slotted or perforated liner, attribution of water or gas production to a particular coal seam may be difficult due to commingling of production from the multiple coal seams.

Conventionally, completed wells having slotted or perforated liners may include an annulus between the liner and the sidewall of the borehole. This annulus provides a pathway for fluids and gases to move from the coal seam longitudinally along the annulus as well as radially towards and through the slotted or perforated liner. The longitudinal and/or radial pathways may complicate determination of fluid and gas inflow rates from coal seams intersected by the borehole. These complications may include:

A) difficulty in attributing gas production to a particular coal seam. This difficulty may result in problems in determining gas reserves for particular coals seams, complicating determination of proven and probable reserves and therefore, Final Investment Decisions (FID). A FID is a final decision of the Capital Investment Decision (CID), as part of the long term corporate finance decisions based on key criteria to manage company's assets and capital structure. It normally follows on from project definition, which is associated with Front End Engineering and Design (FEED)

B) uncertainty regarding which coal seam or seams are producing gas and/or water during drawdown of water or the production lifecycle; this uncertainty may result in suboptimal selection of which seams to complete in other wells or to "squeeze" with cement in producing wells.

C) uncertainty regarding to what extent the slotted or perforated liner completion methods could improve gas production rate and reduce water production rates.

SUMMARY

The present disclosure is directed to a coal seam producibility determination system. The coal seam producibility determination system includes a fiber optic cable, the fiber optic extending from a DAS interrogation unit into a wellbore. The DAS interrogation unit is located at a surface. The wellbore intersects a plurality of coal seams to be measured, the coal seams comprising fluid and solubilized gas. The wellbore contains wellbore fluid and the wellbore has a wall. The fiber optic cable extends along the plurality of coal seams. The coal seam producibility determination system further includes a spectrometer, the spectrometer located at the surface or within the wellbore. The coal seam producibility determination system also includes an optical window, the optical window in optical communication with the spectrometer, and the optical window in fluid communication with the wellbore fluid.

The present disclosure further provides for a method. The method includes providing a coal seam producibility determination system, the coal seam producibility determination system including a fiber optic cable, the fiber optic extending from a DAS interrogation unit into a wellbore. The DAS interrogation unit is located at a surface. The wellbore intersects a plurality of coal seams to be measured, the coal seams containing fluid and solubilized gas. The wellbore contains wellbore fluid having an annulus fluid level, and the wellbore has a wall. The fiber optic cable extends along the plurality of coal seams. The coal seam producibility determination system also includes a spectrometer, the spectrometer located at the surface or within the wellbore. The coal seam producibility determination system also includes an optical window, the optical window in optical communication with the spectrometer, and the optical window in fluid communication with the wellbore fluid. The method also includes holding the annulus fluid level at a constant level at a first fluid height by removing wellbore fluid from the wellbore, the constant level above a level of the highest coal seam. In addition, the method includes determining an initial flow rate corresponding to the rate at which wellbore fluid is removed from the wellbore, and measuring the CDP, gas content, and gas saturation value for wellbore fluid removed from the wellbore at the constant level.

BRIEF DESCRIPTION OF THE DRAWINGS

The present disclosure may be understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION OF THE DISCLOSURE

A detailed description will now be provided. The following disclosure includes specific embodiments, versions and examples, but the disclosure is not limited to these embodiments, versions or examples, which are included to enable a person having ordinary skill in the art to make and use the disclosure when the information in this application is combined with available information and technology.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Different types of wells for producing coal seam gas may present different issues. For example, for newly drilled wells, i.e., wells scheduled for drilling, producers may desire prediction and validation of water and gas in contributing and non-contributing zones. In existing wells, such as wells completed via underream and perforated liners, producers may desire to identify water and gas in contributing and non-contributing zones.

Certain embodiments of the present disclosure are directed to a coal seam producibility determination system that may include a Distributed Acoustic Sensor (DAS device) in combination with a chemical or physical sensor, such as a spectrometer, for instance, a Raman spectrometer. In these embodiments, the coal seam producibility determination system may provide data for determining fluid and gas flow rate, under static or dynamic conditions, from one or more coal seams in a coalbed methane well, for use with the chemical or physical sensor, which analyzes solution gas in commingled fluid flow from a wellhead.

Figure 1A:
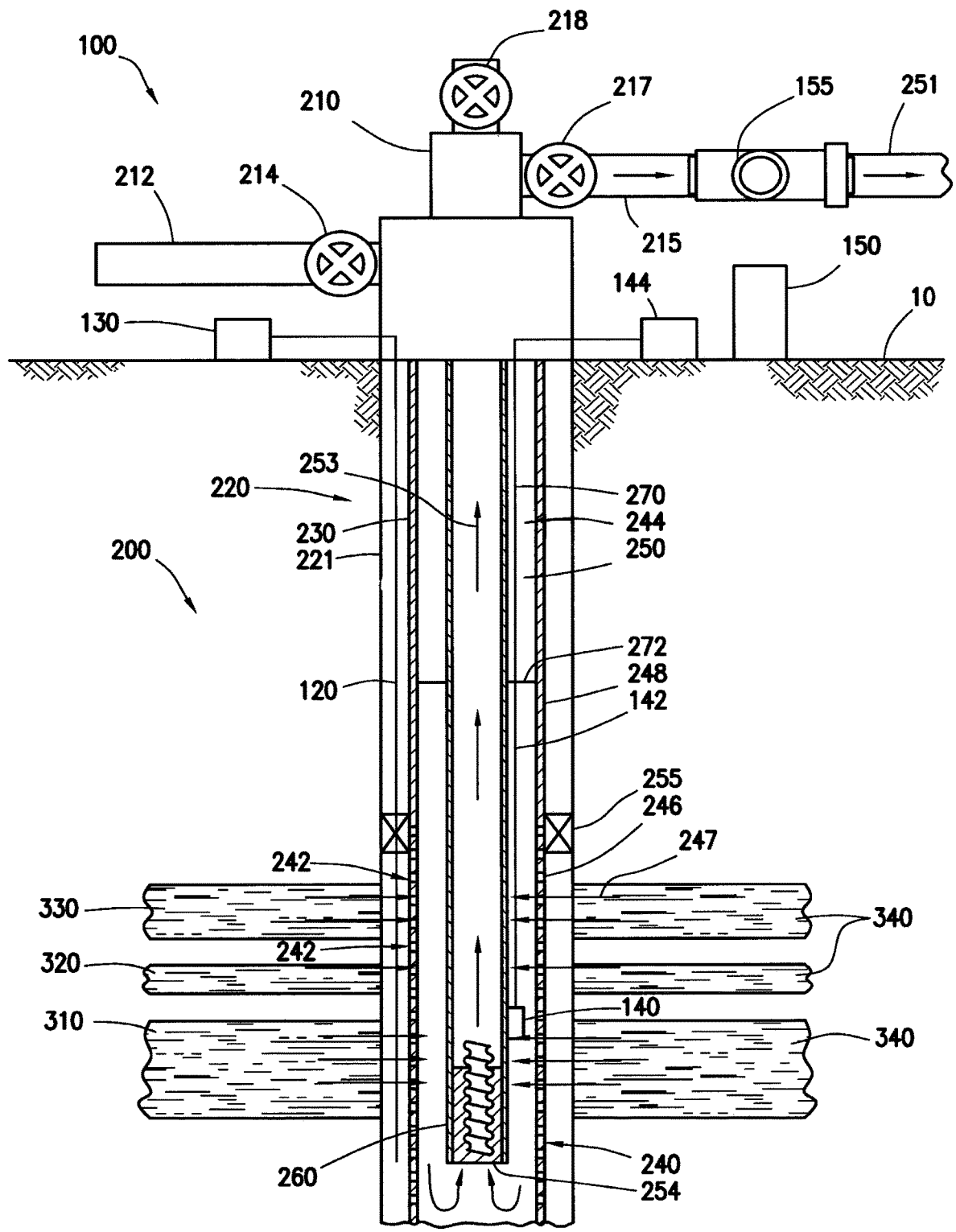
FIG. 1A depicts a coal seam producibility determination system consistent with at least one embodiment of the present disclosure.

FIG. 1A depicts coal seam producibility determination system 100 for use in a slotted liner coal seam gas (slotted CSG) well 200. Slotted CSG well 200 includes wellhead 210 positioned above wellbore 220. Wellhead 210 may include gas flowline 212 with gas flowline isolation valve 214. Wellhead 210 may further include water flowline 215 with water flowline isolation valve 217. In certain embodiments, wellhead 210 may also include wellhead connection valve 218.

Wellbore 220 may intersect one or more coals seams, shown in FIG. 1A as coal seams 340, which include lower coal seam 310, middle coal seam 320 and upper coal seam 330. As one of ordinary skill in the art with the benefit of this disclosure will appreciate, wellbore 220 may intersect any number of coals seams 340 and the three coals seams 340 intersected in FIG. 1A are exemplary only. Casing 230 may be located within wellbore 220 and mechanically connected to wellbore 220. Slotted liner 240 may be hung from casing 230 within wellbore 220. Slotted liner 240 may include one or more slots 242 for fluid communication between coal seams 340 and completion tubing 250. In operation, fluid containing solubilized gas from coals seams 340 may enter slotted CSG well 200 through slots 242, as shown by fluid entry arrows 247. Completion tubing 250 may be mechanically connected to wellhead 210 and fluidly connected to gas flowline 212 and water flowline 215. Wellbore annulus 244 is formed between wellbore wall 221 and slotted liner outer wall 246 and casing outer wall 248. In the embodiment depicted in FIG. 1A, packer 255 is located in wellbore annulus 244 at the top of slotted liner 240 to restrict fluids from migrating to surface 10 through wellbore annulus 244 and to restrict cement from entering the annulus between the coal seams 340 and slotted liner 240. Wellbore annulus 244 between wellbore wall 221 and casing outer wall 248 may be filled with cement (cement sheath). In the embodiment depicted in FIG. 1A, submersible pump 260 may be located within completion tubing 250. Submersible pump 260 may be in fluid communication with coal seams 340 through slots 242 of slotted liner 240. In operation, submersible pump 260 may remove fluid containing solubilized gas by pumping the fluid to the surface through completion tubing 250, as shown by surface discharge arrows 253, through wellhead 210 and out water flowline 215, as shown by water flowline arrow 251. Submersible pump 260 may be located at or near completion tubing bottom 254. Submersible pump 260 may be located below the lowest coal seam to be measured, which as shown in FIG. 1A, is lowest coal seam 310.

Inner annulus 270 may be located between casing 230, slotted liner 240 and completion tubing 250. As shown in FIG. 1A, inner annulus 270 may contain wellbore fluid from the bottom of wellbore 220 to annulus fluid level 272. As described herein below, annulus fluid level 272 may be at different levels within inner annulus 270 depending on submersible pump 260 speed, flow from coal seams 340, and other factors.

Coal seam producibility determination system 100 may include one or more fiber optic cables 120 that extend from DAS interrogation unit 130, located at surface 10, and into wellbore 220. The combination of the one or more fiber optic cables and the DAS interrogation unit is referred to herein as the "DAS device." In certain embodiments, fiber optic cables 120 may be positioned within a metal jacketed tube (not shown). Fiber optic cables 120 may be positioned within wellbore annulus 244. In certain embodiments, fiber optic cables 120 may be clamped to slotted liner outer wall 246 and/or casing 230. In certain embodiments, one or more fiber optic cables 120 may extend along coal seams 340. In certain embodiments, one or more fiber optic cables 120 may be positioned during deployment of casing 230 and slotted liner 240. DAS interrogation unit 130 may be adapted to shine light, such as visible light, along optical fibers within one or more fiber optic cables 120.

Coal seam producibility determination system 100 may further include pressure gauge 140 located within wellbore 220. In certain embodiments, pressure gauge 140 may be clamped to completion tubing 250 and adapted to measure the pressure in inner annulus 270. Pressure gauge 140 may communicate measurements taken along electrical cable 142 to pressure gauge interrogation unit 144, located at surface 10. In some embodiments, pressure gauge 140 in conjunction with pressure gauge interrogation unit 144 may be adapted to determine annulus fluid level 272. In some embodiments, determining annulus fluid level 272 may be accomplished by other suitable methods know to those of skill in the art, such as an echometer.

In addition, coal seam producibility determination system 100 may include a chemical or physical sensor, such as spectrometer 150. Spectrometer 150 may be in optical communication with an optical interface, such as optical window 155.

Figure 1B:
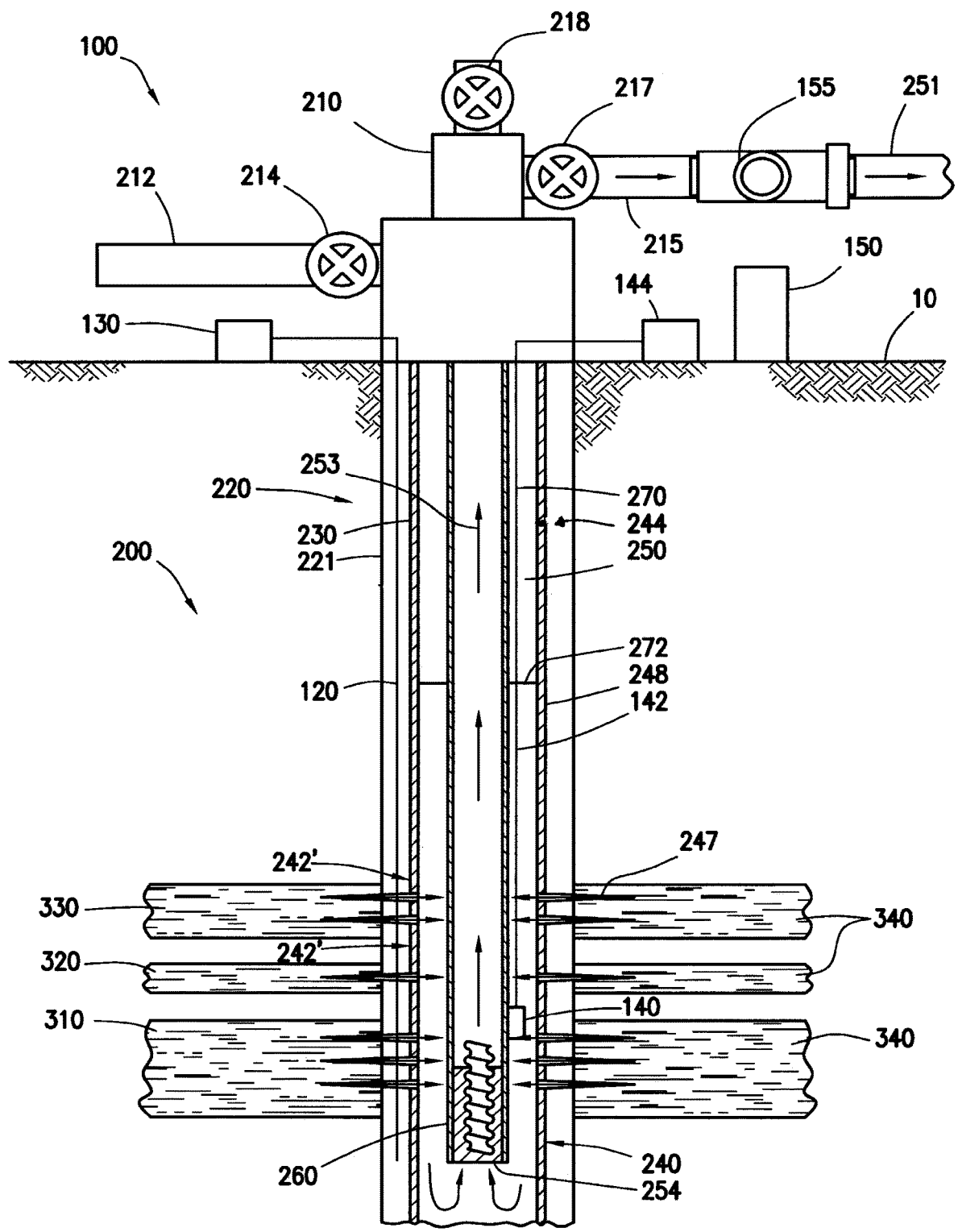
FIG. 1B depicts a coal seam producibility determination system consistent with at least one embodiment of the present disclosure.

FIG. 1B depicts another embodiment of the present disclosure wherein coal seam producibility determination system 100 is used in a cased and perforated CSG well 200'. In cased and perforated CSG well 200', slotted liner 240 and packer 255 are omitted. Instead, casing 230 is extended to the bottom or near the bottom of wellbore 220. A cement sheath may be extended to the bottom of wellbore 220. Perforations 242' may be formed in casing 230 fluidly connecting coal seams 340 to completion tubing 250.

During testing operations for gases located within coal seams 340 from slotted CSG well 200 or cased and perforated CSG well 200', flow from coal seams 340 may be detected using fiber optic cables 120 in conjunction with DAS interrogation unit 130. For instance, as shown in U.S. patent application US 2014/0163889, which is incorporated herein by reference, back-scattered light transmitted back through a fiber of fiber optic cables 120 to the DAS interrogation unit 130 may be analyzed to determine the rate of fluid flow passing around it. As described in US 2014/0163889, one non-limiting example of the fiber optic cables 120 in conjunction with the DAS interrogation unit 130 is shown in FIG. 11.

Figure 11:
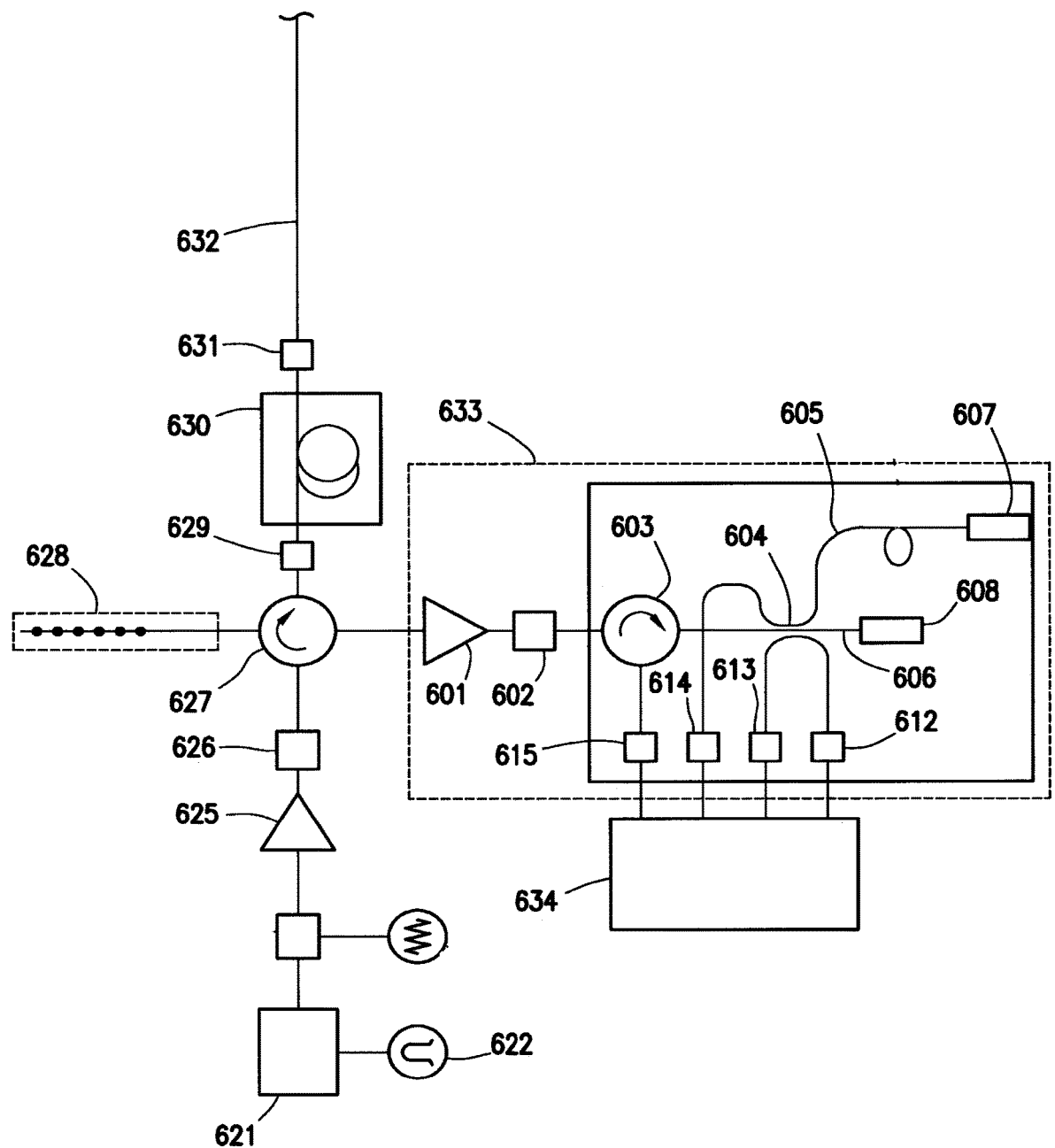
FIG. 11 depicts a DAS interrogation unit in conjunction with a fiber optic cable.

With reference to FIG. 11, light emitted by a laser 621 may be modulated by a pulse signal 622. An optical amplifier 625 is used to boost the pulsed laser light, followed by a band-pass filter 626 to filter out the Amplified Spontaneous Emission noise (ASE) of the amplifier. The optical signal is then sent to an optical circulator 627. An additional optical filter 628 may be used at one port of the circulator 627. The light is sent to sensing fiber 632, which is, for example, a single mode fiber or a multimode fiber. A length of the fiber may be isolated and used as a reference fiber 630, for example in a "quiet" location or with a controlled reference signal. The reference fiber 630 may be formed between reflectors or a combination of beam splitters and reflectors 629 and 631. The reflected and the backscattered light generated along the sensing fiber 632 is directed through the circulator 627 and into the interferometer 633.

Within the interferometer, the incoming light is amplified in an optical amplifier 601, and transmitted to the optical filter 602. The filter 602 filters the out of band ASE noise of the amplifier 601. The light then enters into an optical circulator 603 which is connected to a 3×3 optical coupler 604. A portion of the light is directed to the photodetector 612 to monitor the light intensity of the input light. The other portions of light are directed along first and second optical paths 605 and 606, with a path length difference between the two paths. Faraday-rotator mirrors (FRMs) 607 and 608 reflect the light back through the first and second paths 605 and 606, respectively. The Faraday rotator mirrors provide self-polarization compensation along optical paths 605 and 606 such that the two portions of light efficiently interfere at each of the 3×3 coupler 604 ports. The optical coupler 604 introduces relative phase shifts of 0 degrees, +120 degrees and −120 degrees to the interference signal, such that first, second and third interference signal components are produced, each at a different relative phase.

First and second interference signal components are directed by the optical coupler 604 to photodetectors 613 and 614, and the third interference signal component incident on the optical circulator 603 is directed towards photodetector 615.

The photodetectors 612, 613, 614 and 615 convert the light into electrical signals. The electrical signals are digitized and then the relative optical phase modulation along the reference fiber 630 and the sensing fiber 632 is computed using a fast processor unit 634. The processor unit is time synchronized with the pulse signal 622. The path length difference between path 605 and path 606 defines the spatial resolution, and the origin of the backscattered light (i.e. the position of the measured condition) is derived from the timing of the measurement signal. Rapid measurement is made possible by measuring light intensity only.

Methods for calculating the relative phase and amplitude from three phase shifted components of an interference signal are known from the literature. The phase angle data (or relative phase) is sensitive to acoustic perturbations experienced by the sensing fiber. As an acoustic wave passes through the optical fiber, it causes the glass structure to contract and expand. This varies the optical path length between the backscattered light reflected from two locations in the fiber (i.e. the light propagating down the two paths in the interferometer), which is measured in the interferometer as a relative phase change. In this way, the optical phase angle data can be processed to measure the acoustic signal at the point at which the light is reflected or backscattered. The result is that the true acoustic field can be measured at any and/or all points along the fiber.

Figure 12:
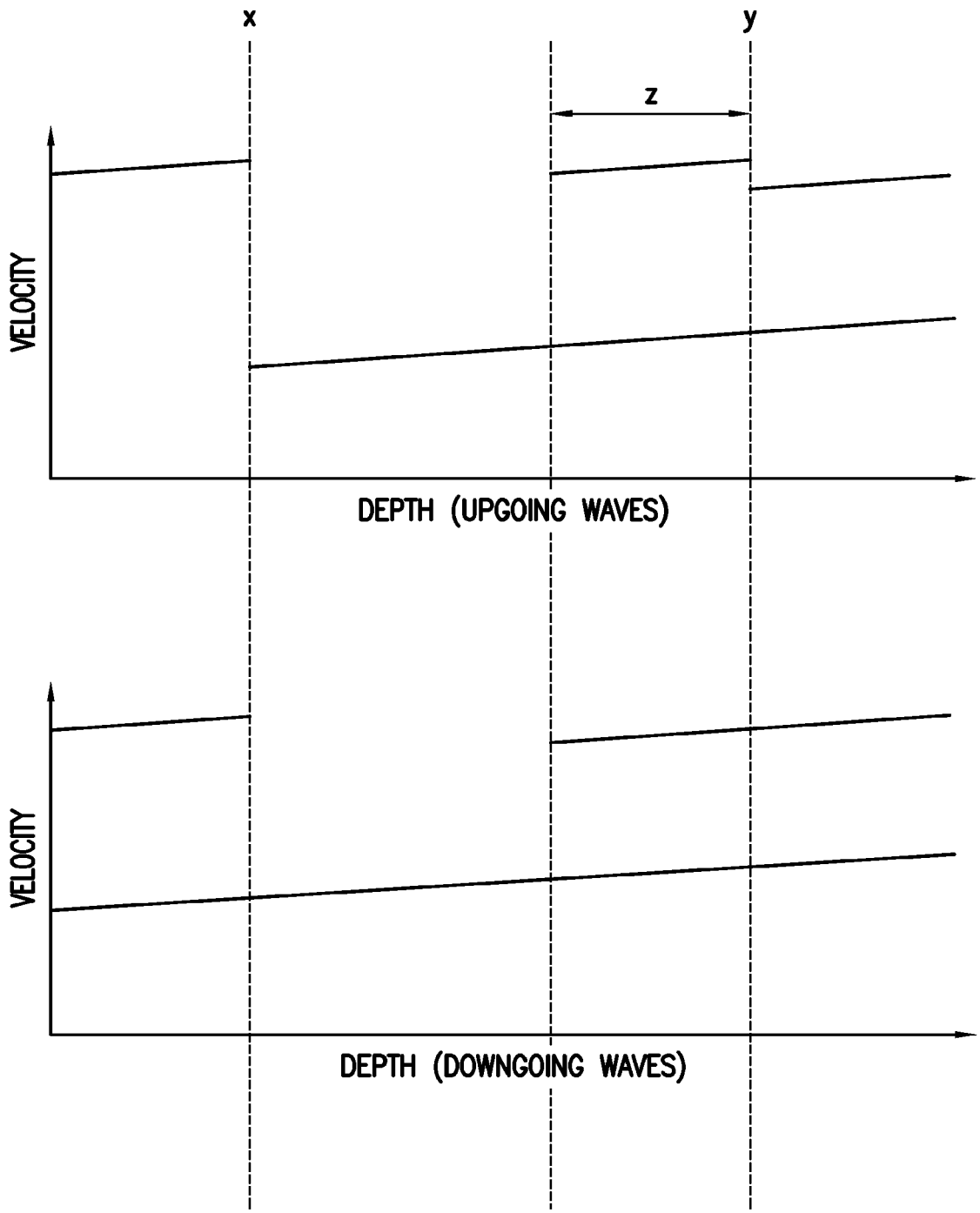
FIG. 12 illustrates, as a function of depth, the speed of sound waves travelling within a well in an upwards direction and a downwards direction.

It is possible to obtain a continuum of acoustic signal measurements along a length of optical fiber. An optical fiber deployed within a well and the DAS interrogation unit may be employed to measure, in real-time, sound as a function of depth. From measurements taken over a period of time, it is possible to derive a measure of the speed of sound corresponding to a particular acoustic signal at a particular position along the fiber (and hence at a particular depth in a well). Such information may be used to determine the flow contributions from multiple coal seams 340 straddled by the optical fibers of fiber optic cables 120 to be quantified. FIG. 12 shows as schematic data featuring in the upper graph the speed of upward-travelling sound waves within a well as a function of depth and featuring in the lower graph the speed of downward-travelling soundwaves within a well as a function of depth. A color map may provide information related to intensity (i.e. amplitude), with red indicating strongest signal power and blue indicating weakest signal power. From these graphs, it is possible to determine characteristics and/ or diagnostic information about the well. In particular, at a particular depth the difference between the speed of upward-travelling sound waves and downward-travelling sound waves directly yields the velocity of the fluid at that depth.

In addition, during testing operations for gases located within coal seams 340 from slotted CSG well 200 or cased and perforated CSG well 200', fluid and solubilized gas may exit wellbore 220 through water flowline 215. Spectrometer 150 may analyze the solubilized gas in water flowline 215.

In some embodiments, during testing operations for gases located within coal seams 340, pressure gauge 140 may measure the pressure in inner annulus 270 and communicate measurements taken along electrical cable 142 to pressure gauge interrogation unit 144, located at surface 10.

Figure 2:
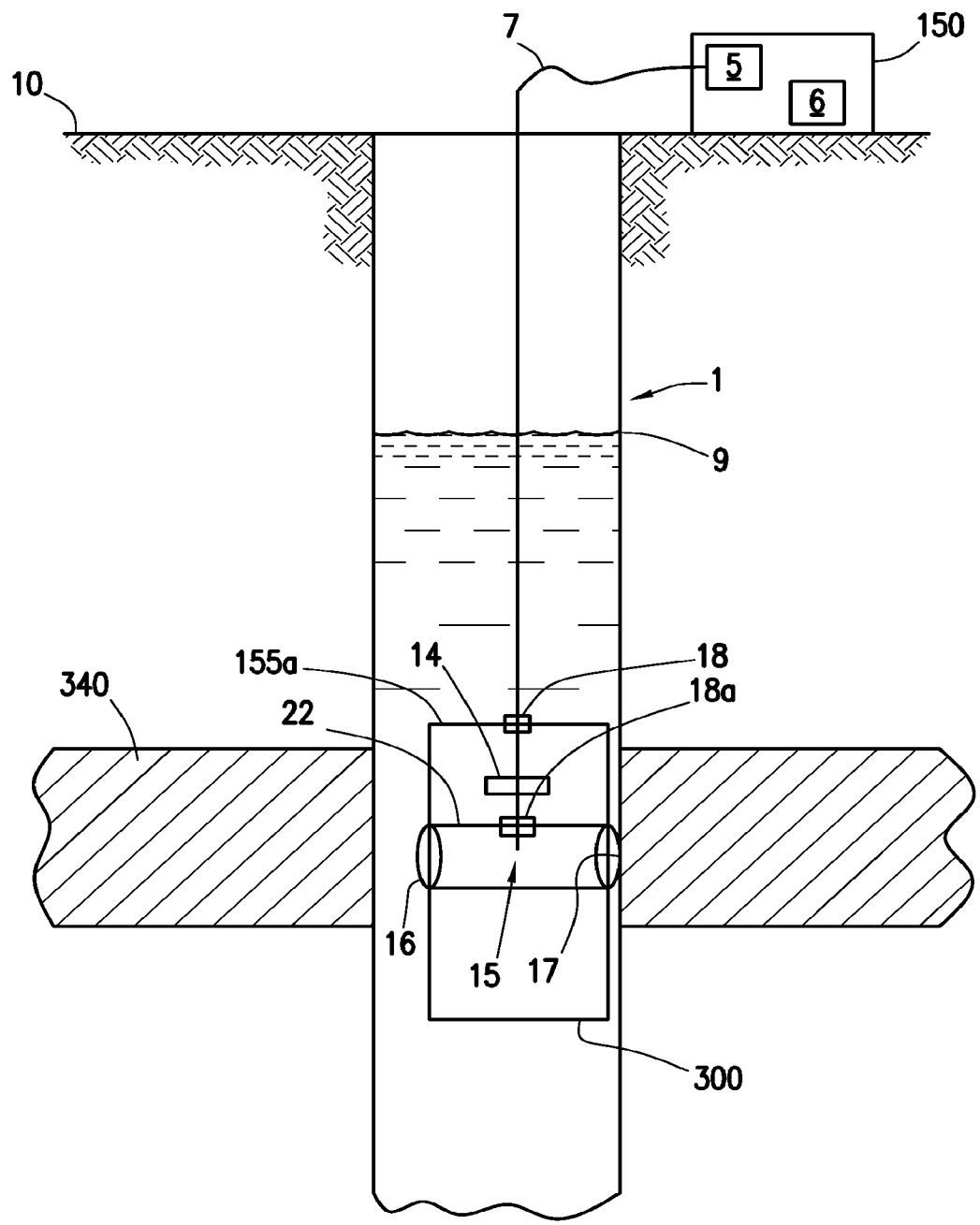
FIG. 2 depicts a spectrometer consistent with at least one embodiment of the present disclosure.
Figure 3:
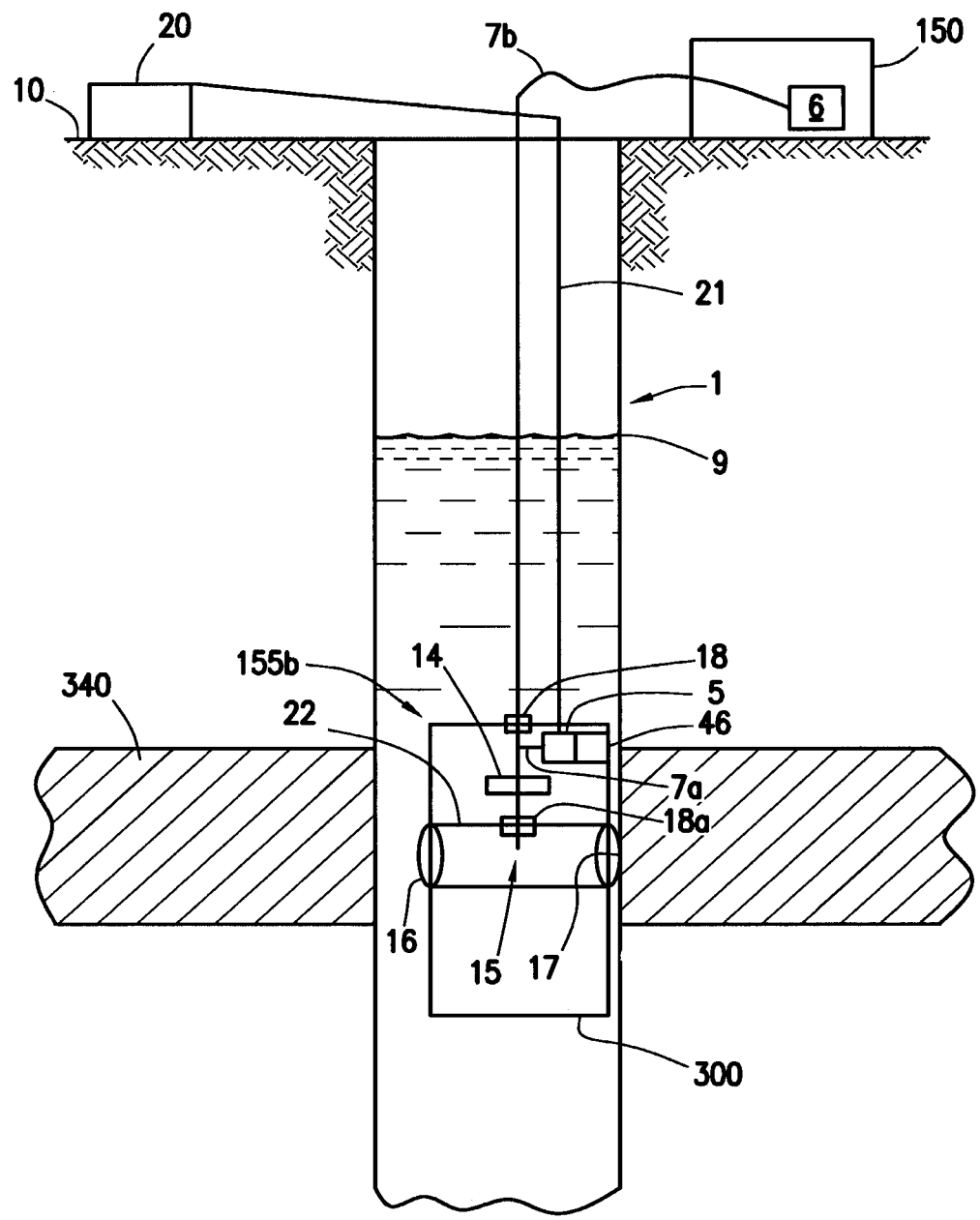
FIG. 3 depicts a spectrometer consistent with at least one embodiment of the present disclosure.
Figure 4:
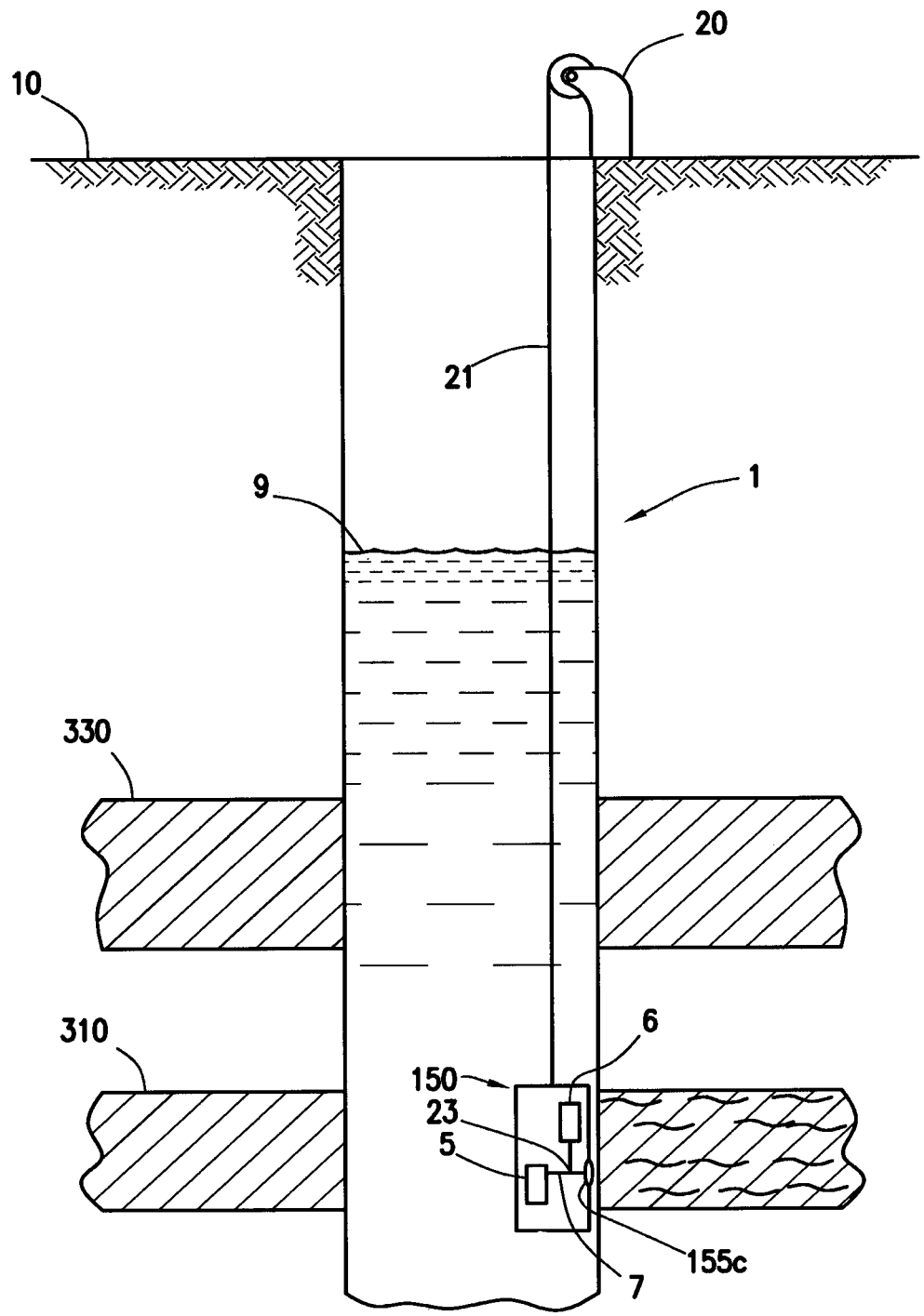
FIG. 4 depicts a spectrometer consistent with at least one embodiment of the present disclosure.

As shown in FIGS. 1A and 1B, spectrometer 150 is located at surface 10 and optical window 155 is located on water flowline 215. In other embodiments, spectrometer 150 and optical window 155 may be located downhole, as described in U.S. Pat. No. 6,678,050, which is incorporated herein by reference. In certain embodiments, spectrometer 150 may be a Raman spectrometer. In certain embodiments, spectrometer 150 may be replaced with a METS sensor (or other gas sensor) or a total gas pressure sensor. FIGS. 2, 3 and 4 depict additional embodiments of spectrometer 150 in accordance with this disclosure. FIG. 2 depicts spectrometer 150 located at surface 10, and optical interface 155a deployed in wellbore 1. Spectrometer 150 includes radiation source 5 for producing incident radiation to transmit down wellbore 1 to interface with the fluid 9 within wellbore 1. Spectrometer 150 includes radiation detector 6. Optical interface 155a may include optical pathway 7, providing optical communication with spectrometer 150. In some embodiments, optical pathway 7 is an optical fiber. Optical pathway 7 may include a guide wire and optical fibers. For example and without limitation, optical pathway 7 may be a bundle of optical fibers, including a center fiber that transmits the incident radiation from radiation source 5, and one or more additional fibers that transmit the characteristic radiation to radiation detector 6. In some embodiments, optical pathway 7 includes a lens for optically coupling with fluid 9. In certain embodiments, optical interface 155a includes housing 300. In some embodiments, housing 300 is a steel housing. In certain embodiments, optical interface 155a includes additional sensors for pressure, temperature, and conductivity, which may be incorporated into an endcap of housing 300 (not shown). Optical pathway 7 may pass into housing 300 through high-pressure feed-through jacket 18. High-pressure feed-through jacket 18 may allow optical pathway 7 to enter housing 300 without subjecting elements of optical interface 155a within housing 300 to the conditions within the wellbore 1, such as high pressure, particles and fluids. Housing 300 may protect filter 14 or other instrumentation enclosed by housing 300. Optical pathway 7 may extend out of housing 300 through inlet high-pressure feed-through jacket 18a to optically couple with fluid 9 at tip 15. Tip 15 of optical pathway 7 may supply the incident radiation from radiation source 5 and collect the characteristic radiation. Tip 15 may be a polished tip or fused tip, for example. Housing 300 includes sample interface 22, including inlet 16 and outlet 17, for fluidly coupling fluid 9 with tip 15.

In operation, fluid 9 flows into inlet 16 when housing 300 is positioned within wellbore 1, and flows around tip 15, interacting with the incident radiation from radiation source 5. The incident radiation from radiation source 5 may be transmitted through at least one optical pathway 7. The gas or liquid in the fluid may interact with the incident radiation, forming a characteristic radiation for the gas or liquid. The characteristic radiation may be transmitted by optical pathway 7 to radiation detector 6 located within spectrometer 150.

FIG. 3 depicts spectrometer 150 in accordance with certain embodiments. As shown in FIG. 3, spectrometer 150 with radiation detector 6 is located at surface 10, and optical interface 155b is located within wellbore 1. Radiation source 5 is located within optical interface 155b. Without being bound by theory, locating radiation source 5 within wellbore 1 may reduce effects of long distance transmission of the incident radiation. Radiation source 5 may be positioned within wellbore 1 by lowering radiation source 5 with guide wire 21 to a depth. The depth may be controlled by guide controller 20 at surface 10. In some embodiments, guide wire 21 is a wireline having an insulated electrical conductor inside a braided inner and outer armor. In some embodiments, guide wire 21 is a slickline having a solid smooth non-braided metal construction. In some embodiments, guide wire 21 is coiled tubing, drill stem, or another type of guide. Guide wire 21 may be provided for positioning housing 300 down the well and may also transmit signals to a data recorder or other processor at surface 10. In some embodiments, a signal or data storage device is located in housing 300 (not shown). In some embodiments, guide wire 21 provides electrical power to instrumentation located in housing 300, or a battery may be located in housing 300 (not shown). The incident radiation from radiation source 5 may be transmitted by way of at least one optical pathway 7a to interact with gas or liquid, forming characteristic radiation. The characteristic radiation may then be transmitted by optical pathway 7b to radiation detector 6. In some embodiments, radiation source 5 is electrically powered by battery 46 or by guide wire 21 with electrical conductors (not shown).

FIG. 4 depicts an embodiment in which spectrometer 150, including radiation source 5 and radiation detector 6, is located within wellbore 1. Radiation source 5 provides the incident radiation through optical pathway 7, which may or may not be an optical fiber. The incident radiation may be directed to beam splitter 23 and through optical interface 155c, shown here as a window, to interact with the gas or liquid, forming characteristic radiation. The characteristic radiation may then be transmitted through optical interface 155c, through beam splitter 23, and to radiation detector 6.

Use of DAS alone is insufficient to determine the chemical character of the fluid being produced from each zone, and so is not able to determine other production factors, such as CDP, gas content and gas saturation of each coal seam. Conversely, use only of a chemical or physical sensor positioned at a wellhead, such as a Raman spectrometer (or METS sensor or a total gas pressure sensor with an appropriate filter), that analyzes solution gas in commingled fluid flow, will also not be sufficient to determine production factors, such as CDP, gas content and gas saturation, of each coal seam, as this requires knowledge of the flow contributions from each coal seam. Furthermore, the measurements obtained at any instance in time from use of both sensors is insufficient to determine production factors, such as CDP, gas content and gas saturation, of each coal seam, as there are too many unknowns that need to be solved, namely the solution gas concentration of each coal seam.

In the embodiments described herein, production factors for one or more coal seams in a coalbed methane well penetrating multiple seams may be determined by implementing a well test methodology in which the flow rate of the overall well production is varied to vary the contributions of gas and water from different zones and thereby result in a different commingled fluid character at the wellhead.

In certain embodiments, production factors for the one or more coal seams may be determined as described in U.S. Pat. No. 8,640,771, which is incorporated herein by reference. As described within U.S. Pat. No. 8,640,771, by measuring a concentration of a gas such as methane dissolved in a coalbed reservoir fluid, correlating the gas concentration to a partial pressure of gas in the fluid, and correlating the partial pressure of the gas in the fluid to the partial pressure of gas in the reservoir, the partial pressure of gas in the reservoir may be correlated to a gas content in the coal as well as a determination of other production factors. This process is described hereinbelow.

Figure 8:
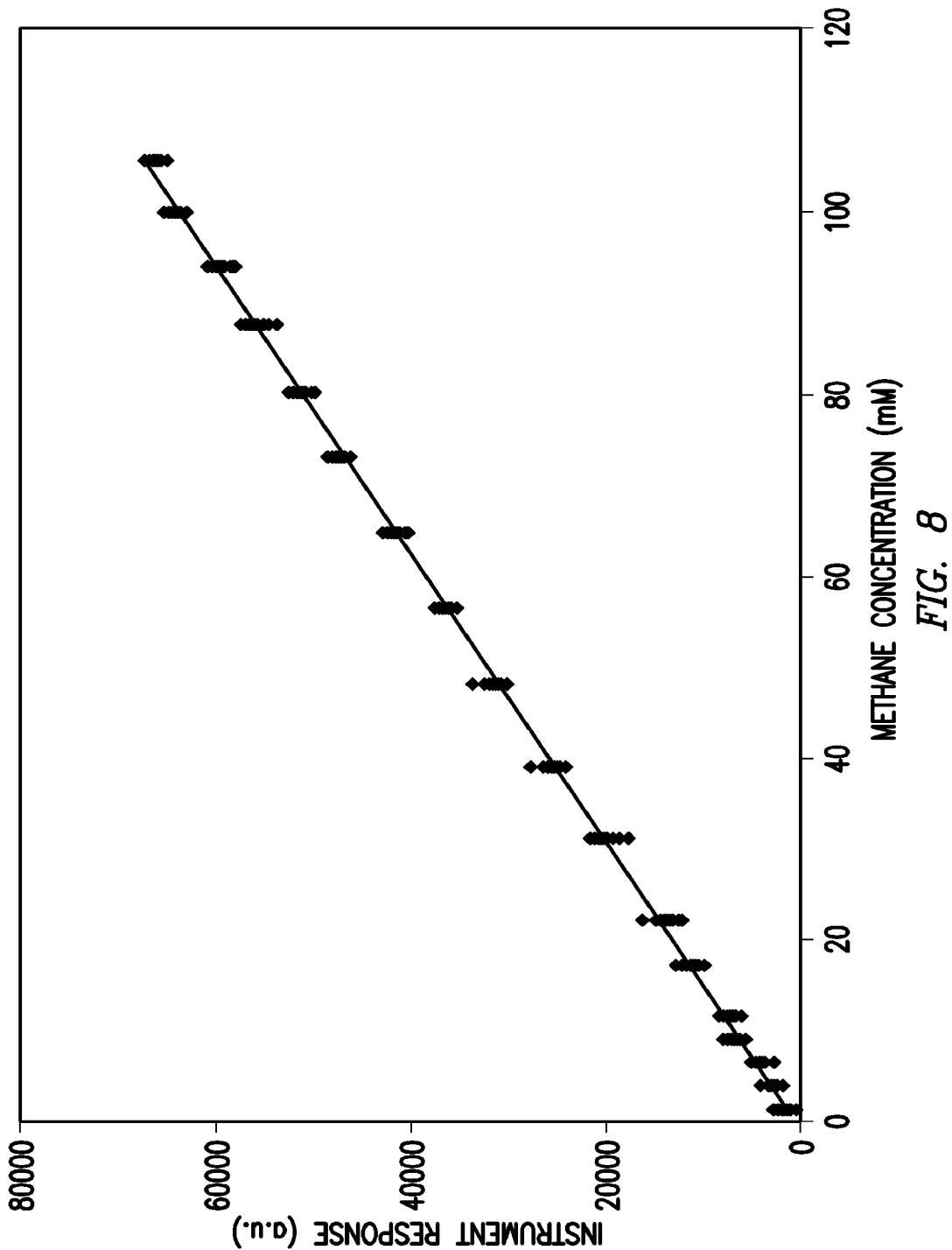
FIG. 8 shows a graph of a calibration between signal to methane concentration consistent with at least one embodiment of the present disclosure.

For example, a relationship between dissolved methane concentration and partial pressure of methane typical of some coal seam reservoir fluids and coal seam reservoir conditions is shown in FIG. 8.

The methane partial pressure in a reservoir fluid can thus be determined by measurement of the dissolved methane concentration in that fluid.

The methane partial pressure in a reservoir fluid can then be used to determine the methane partial pressure in an overall reservoir. Under typical reservoir conditions, for fluids that are in physicochemical equilibrium with the reservoir, the methane partial pressure in a reservoir fluid or well fluid is equal to the methane partial pressure in the overall reservoir. For fluids that are not in physicochemical equilibrium with the overall reservoir, one may correct the partial pressure to reflect that state.

Figure 9:
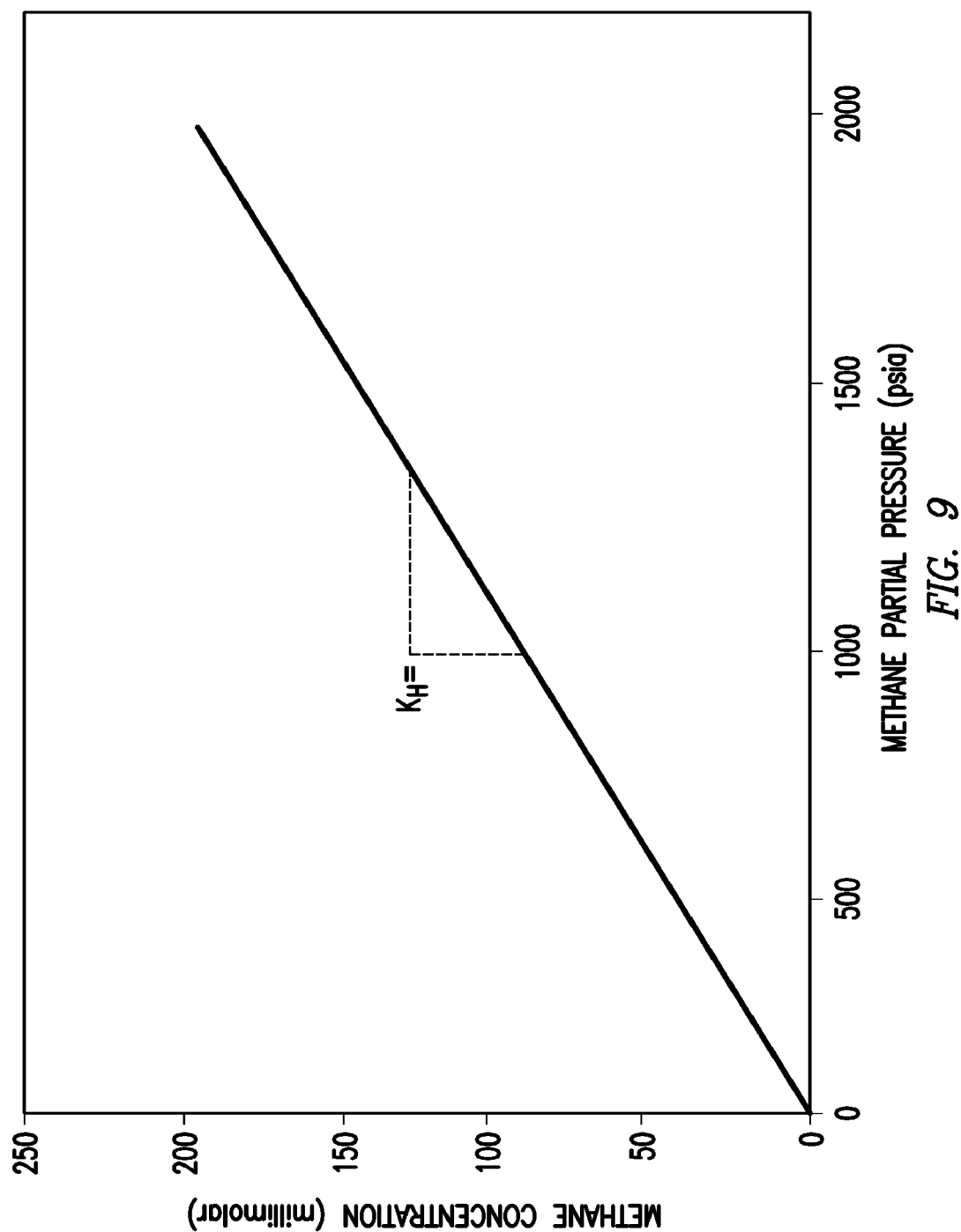
FIG. 9 shows a graph of a relationship between dissolved methane concentration and partial pressure of methane in a reservoir fluid consistent with at least one embodiment of the present disclosure.

The methane partial pressure in a reservoir can then be used to determine the gas content of a coalbed reservoir. FIG. 9 shows such a relationship typical of coal.

Thus, measurement of the concentration of methane dissolved in a coalbed reservoir fluid can be used to analyze quantitatively the gas content of the coal.

Figure 5:
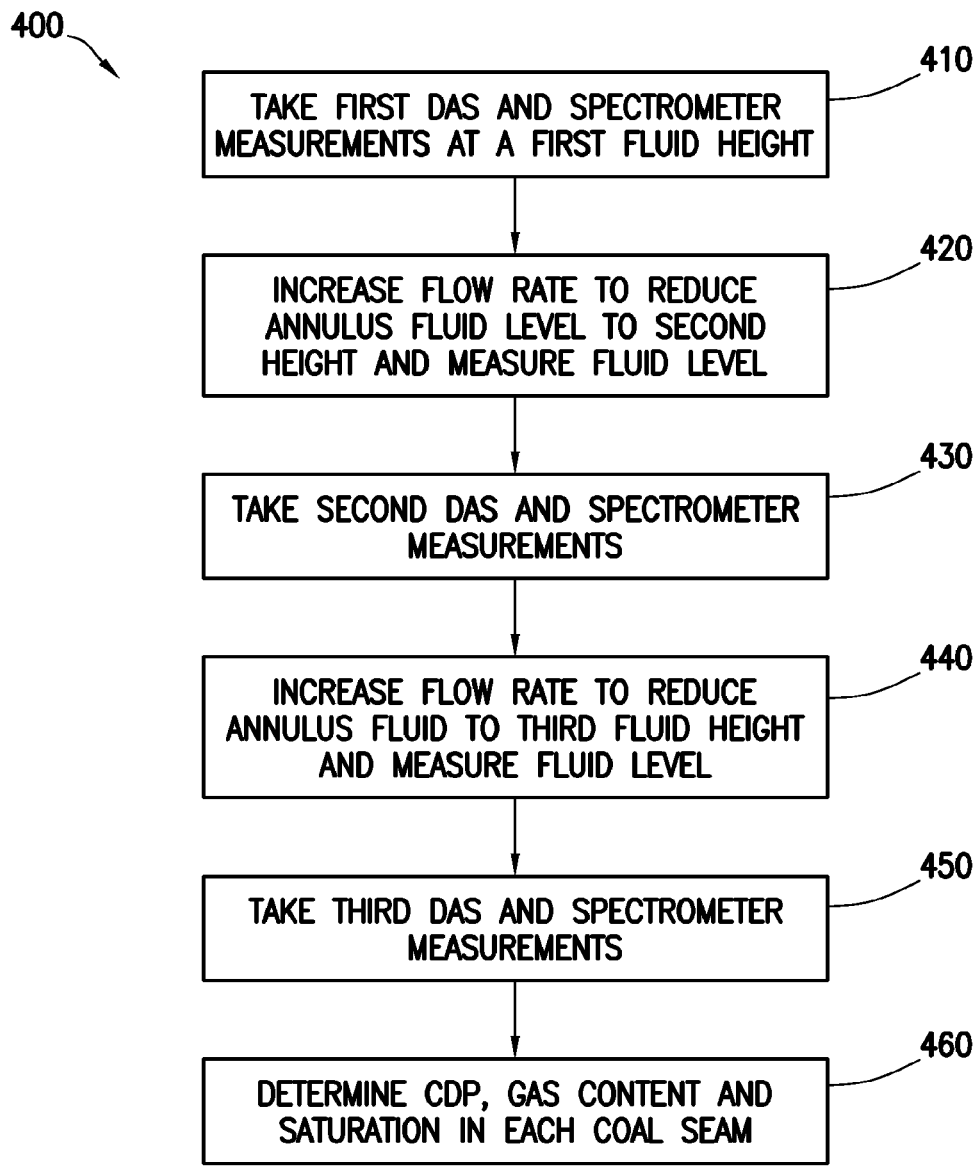
FIG. 5 is a flow chart of a coal seam solubilized gas measurement process consistent with at least one embodiment of the present disclosure.

FIG. 5 depicts a flow chart of coal seam solubilized gas measurement process 400 (hereinafter "process 400"). In process 400, fluid containing solubilized gas from coals seams 340 enters slotted CSG well 200 or cased and perforated CSG well 200' through slots 242 or perforations 242', as shown by fluid entry arrows 247. Submersible pump 260 removes the fluid containing solubilized gas by pumping the fluid to the surface through completion tubing 250, as shown by surface discharge arrows 253, through wellhead 210 and out water flowline 215, as shown by water flowline arrow 251.

In the embodiments depicted in FIGS. 1A, 1B, and 5, annulus fluid level is held at a constant level corresponding to a first fluid height, the constant level determined by submersible pump 260 speed. In these embodiments, the constant level of annulus fluid level is above the highest coal seam to be measured, which as shown in FIGS. 1A and 1B, is upper coal seam 330. First DAS and spectrometer measurements are made at the constant level (410). First DAS measurements determine the flow rate of the commingled fluid from submersible pump 260, while spectrometer measurements determine the solubilized gas concentration in the commingled produced fluid from all coal seams 340 at the first height.

Following first DAS and spectrometer measurements (410), the flow rate of submersible pump is increased and the annulus fluid level is reduced to a second height below that of upper coal seam 330, but above that of middle coal seam 320 (reduced fluid level to second height 420). As part of (420), the annulus fluid level may be measured, such as by pressure gauge 140 in conjunction with pressure gauge interrogation unit 144. After reducing the annulus fluid level to the second height (420), a second set of DAS and spectrometer measurements are taken (430) to determine the flow rate and solubilized gas concentration for the comingled produced fluid from coal seams 310 and 320 at the second height.

Submersible pump 260 speed may then be increased to reduce the annulus fluid level to a third level below middle coal seam 320 but above lower coal seam 310 (440). As part of (440), the annulus fluid level may be measured, such as by pressure gauge 140 in conjunction with pressure gauge interrogation unit 144. A third set of DAS and spectrometer measurements are taken (450) to determine the flow rate and solubilized gas concentration, for the produced fluid from coal seam 310 at the third height.

Following step (450), the solubilized gas concentration in each of the coal seams may be determined, which are then processed to determine CDP, gas content and gas saturation in each coal seam (460). Broadly, the process of varying the flow rate of the overall well production in order to vary the relative flow contributions of gas and water from different zones and capturing surface and downhole measurements with both sensors (DAS and Raman spectrometer) once flow conditions have stabilized after each change in submersible pump 260 flow rate is repeated a number of times equal to the number of contributing coal seams. In this way, a system of n linear equations may be created, where n is the number of individual coal seams behind the slotted liner or perforated casing, involving the same set of n variables, being the unknown solution gas concentration of each coal seam. The form of the equation is as follows:

$$Q_t*CH4_t = Q_1*CH4_1 + Q_2*CH4_2 + Q_3*CH4_3 \ldots Q_n*CH4_n \qquad \text{Equation 1}$$

Figure 6:
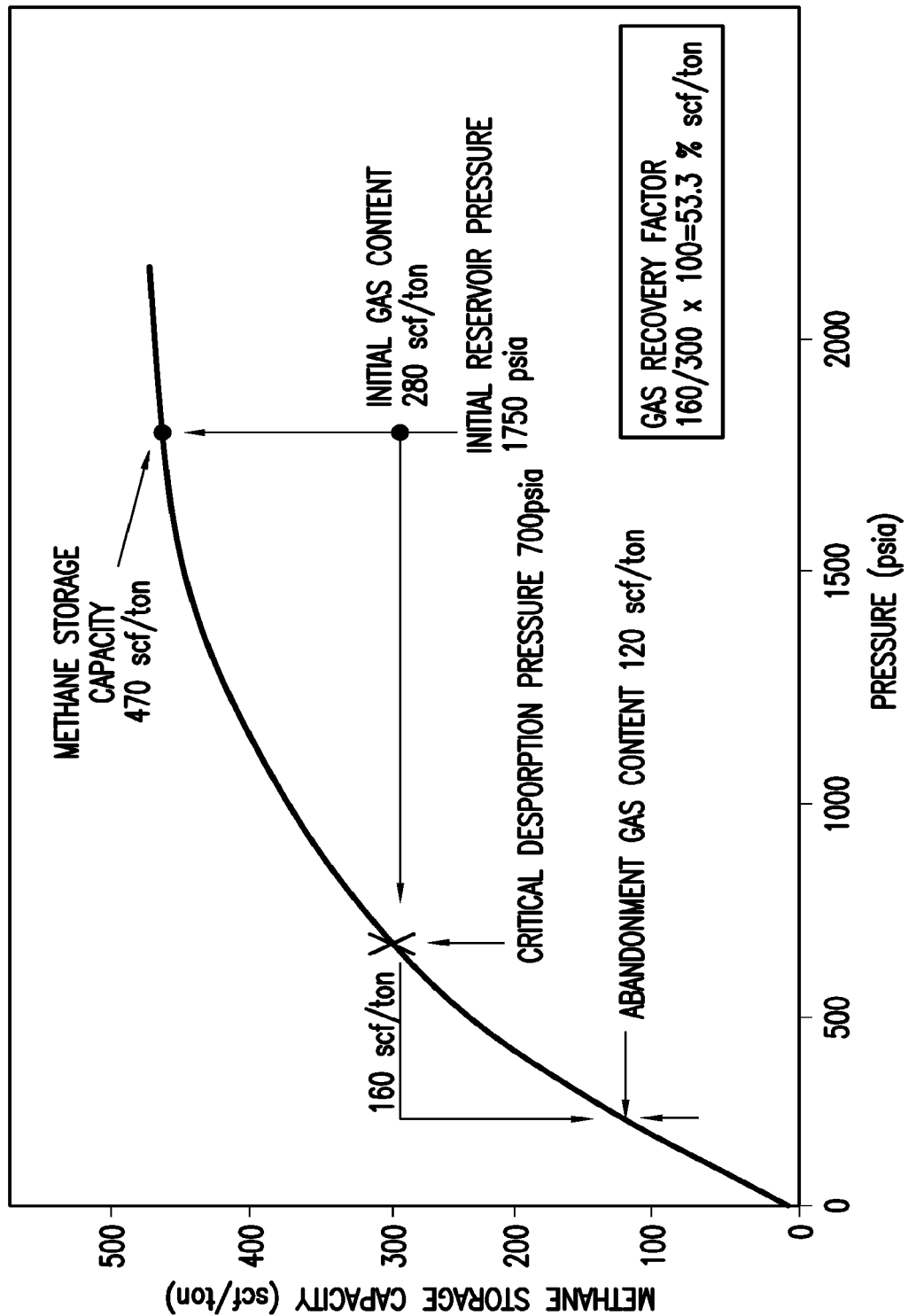
FIG. 6 is a diagram of an isotherm calculation based on gas content consistent with at least one embodiment of the present disclosure.
Figure 7:
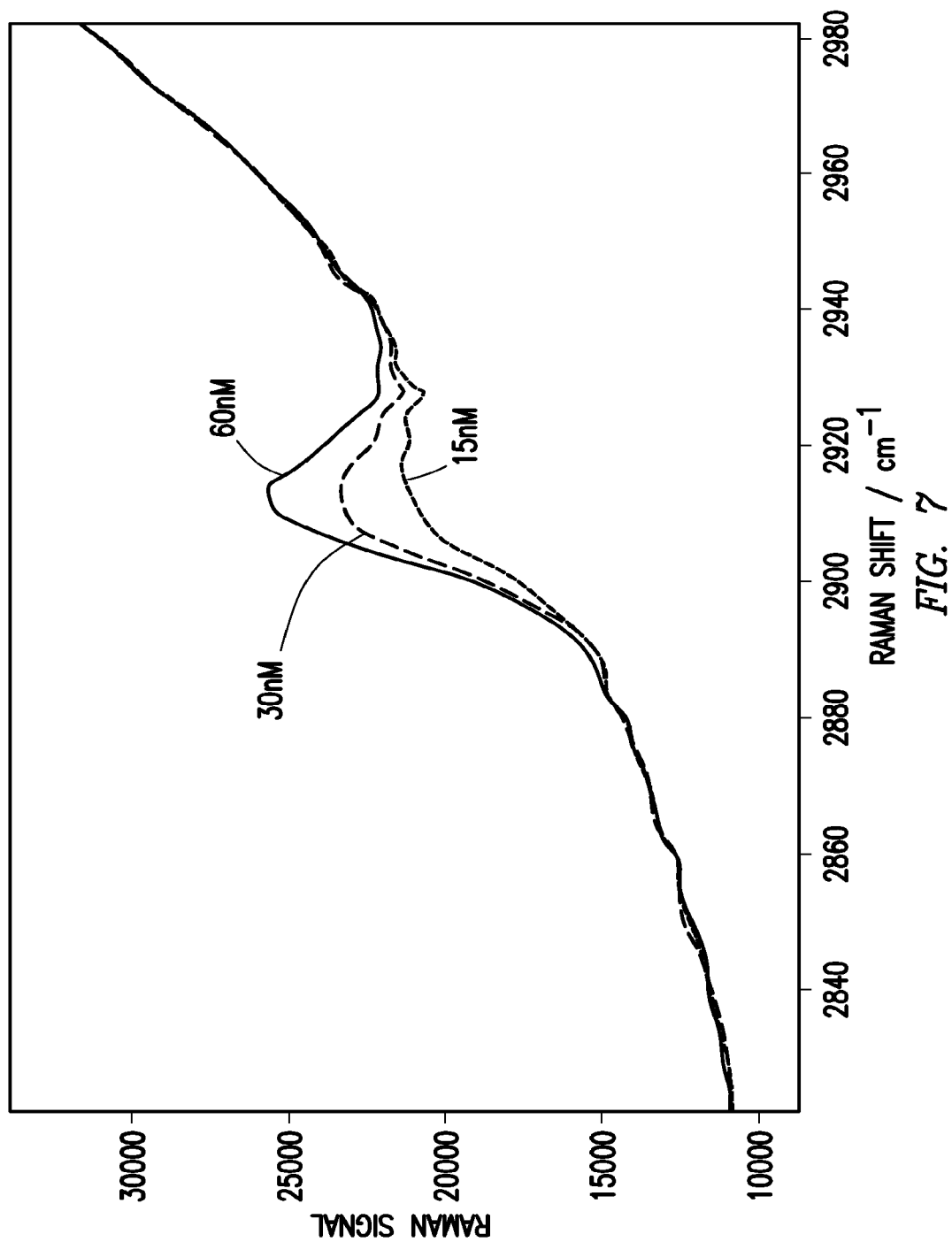
FIG. 7 shows a graph of a spectral signature for methane at three different concentrations consistent with at least one embodiment of the present disclosure.

Where:
$Q_t$=total flow rate (which is sum of the flow rates from all coal seams 1 to n expressed as $Q_1$ to $Q_n$)
$Q_n$=measured flow rate from $n^{th}$ coal seam (using DAS)
$CH4_t$=measured solution gas concentration in comingled flow at wellhead (using Raman spectrometer)
$CH4_n$=unknown solution gas concentration in $n^{th}$ coal seam This system of linear equations may be solved using techniques, such as elimination of variables and row reduction. In this way it is possible to determine solution gas concentration of each coal seam, and thereby attribute key production factors, including CDP, gas content and gas saturation, to individual downhole coal seams. Knowledge of the key production factors for each coal seam allows an operator to identify producing and non-producing seams and more completely represent the coal seam gas reserves to, for instance, auditors The concentration of the gas or the partial pressure of the gas may be measured by spectrometers 150. Conversion of a Raman spectrum to a gas content may include, for example and without limitation, taking Raman spectrum measurement. The Raman spectra measurements may be analyzed to determine gas concentration data, which may in turn be analyzed to determine gas partial pressure data. Alternatively, the Raman spectra measurements may be converted directly to the gas partial pressure data. The gas partial pressure data may then be analyzed along with coal isotherm data (as shown in FIG. 6) to determine gas content. Working in reverse order, to calculate gas content, the partial pressure of the gas in the fluid surrounding the coal and the isotherm of the coal are provided. The isotherm shown in FIG. 6 is a correlation, at a given temperature, between the partial pressure of the gas and the storage capacity of the coal, i.e., the saturated gas content. The isotherm may be known or estimated externally to the Raman measurement. In order to convert between a Raman spectrum and gas partial pressure, spectrometer 150 may be calibrated. Such calibration may include preparing samples of a known gas (e.g., methane) in equilibrium with water at various pressures. Raman spectra of the prepared samples may then be taken. For example and without limitation, FIG. 7 shows the Raman spectral signature of methane dissolved in water for three different samples having different methane concentrations.

The concentration of gas in each sample's fluid may be calculated by Henry's law, using an appropriate Henry's law constant for the given conditions, i.e., temperature, salinity and gas partial pressure, or by some other method that indicates the solubility of the gas in water. This gas in fluid concentration can then be correlated with the intensity of the peak in the Raman spectra of the sample. Alternately, the partial pressure of the gas may be directly correlated with the intensity of the peak in the Raman spectra. By correlating the signals measured for a series of samples with the concentrations of gas dissolved in the samples, it is possible to create a calibration between signal and concentration. FIG. 8 shows such a calibration for Raman signal responses to methane dissolved in water. With the above correlations, either gas concentration or partial pressure may be calculated by measuring the Raman spectrum of an unknown sample. With the partial pressure of the gas calculated, a direct reading from an isotherm, such as that shown in FIG. 6, may be used to determine the gas content.

Dissolved gas concentration, such as methane concentration, may be calibrated to the partial pressure of the gas in the reservoir fluid. For ideal fluids and conditions, the relationship between dissolved gas concentration and the partial pressure of the gas in the reservoir fluid may be a linear relationship. For non-ideal fluids, or non-ideal conditions, the relationship between dissolved gas concentration and the partial pressure of the gas in the reservoir fluid may be complex. The relationship between dissolved gas concentration and the partial pressure of the gas in the reservoir fluid can be established for a fluid or condition by preparing samples of reservoir fluids under reservoir conditions, by impinging a partial pressure of gas onto the sample until the reservoir/gas system is at equilibrium. The concentration of the gas may then be measured. This process can be repeated for more than one partial pressure of gas until a relationship between dissolved gas concentration and partial pressure is established. The partial pressures of gas impinged may include values that include the partial pressure of as expected in the reservoir.

FIG. 9 is an exemplary graph of a relationship between methane concentration and methane partial pressure consistent with certain coal seam reservoir fluids and coal seam reservoir conditions in a coal reservoir.

The gas partial pressure in a reservoir fluid may be used to determine the as partial pressure in an overall reservoir. Under typical reservoir conditions, for fluids that are in physicochemical equilibrium with the reservoir, the gas partial pressure in a reservoir fluid or well fluid may be equal to the gas partial pressure in the overall reservoir. For fluids that are not in physicochemical equilibrium with the overall reservoir, the partial pressure may be corrected.

Figure 10:
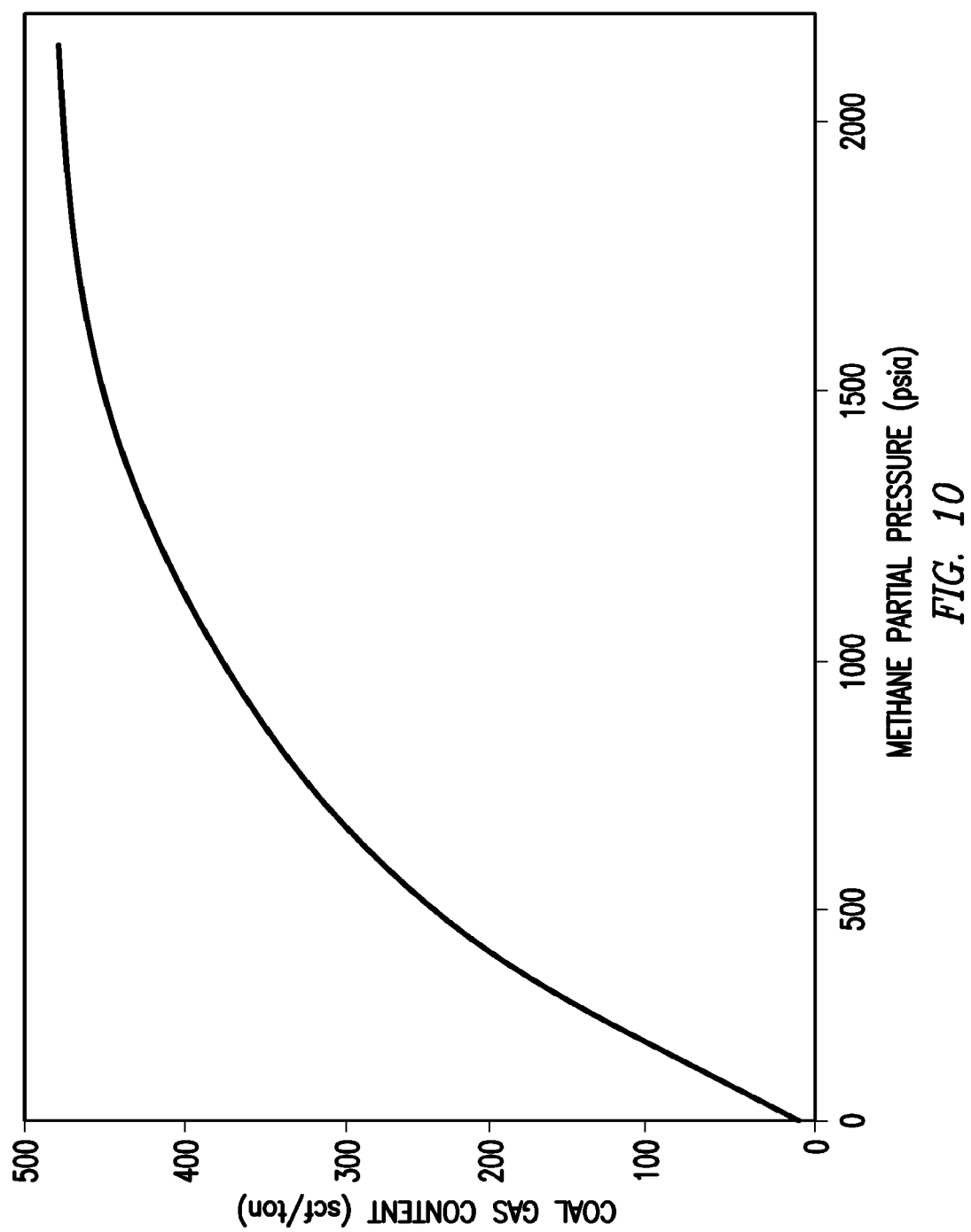
FIG. 10 shows a graph of the relationship between methane partial pressure and coal gas content consistent with at least one embodiment of the present disclosure.

The methane partial pressure in a reservoir may be used to determine the gas content of a coalbed reservoir. FIG. 10 is a graph showing the relationship between coal gas content and methane partial pressure. Thus, measurement of the concentration of methane dissolved in a coalbed reservoir fluid can be used to analyze quantitatively the gas content of the coal.

Other measurements made in a wellbore or on wellbore fluids or gases may be combined with gas concentration, such as methane concentration, to provide a detailed understanding of the coal seam reservoir properties and stage of production. The process of determining coal seam reservoir properties and stages of production may include measurement and/or analysis of reservoir pressure, reservoir temperature, ionic strength of reservoir fluids, saturation limit of methane dissolved in water under reservoir conditions, depth and thickness of coal seams, coal rank, coal thickness, coal ash content, coal masceral content, wellbore diameter, wellbore total depth, casing size, casing type, cement type, cement volume used, perforation locations, perforation sizes, perforation hole density, historical water production volumes and rates, historical gas production volumes and rates, completion and production methodology, cone of depression, reservoir models, well structures, and other relevant variables, and combinations thereof.

Figure 13:
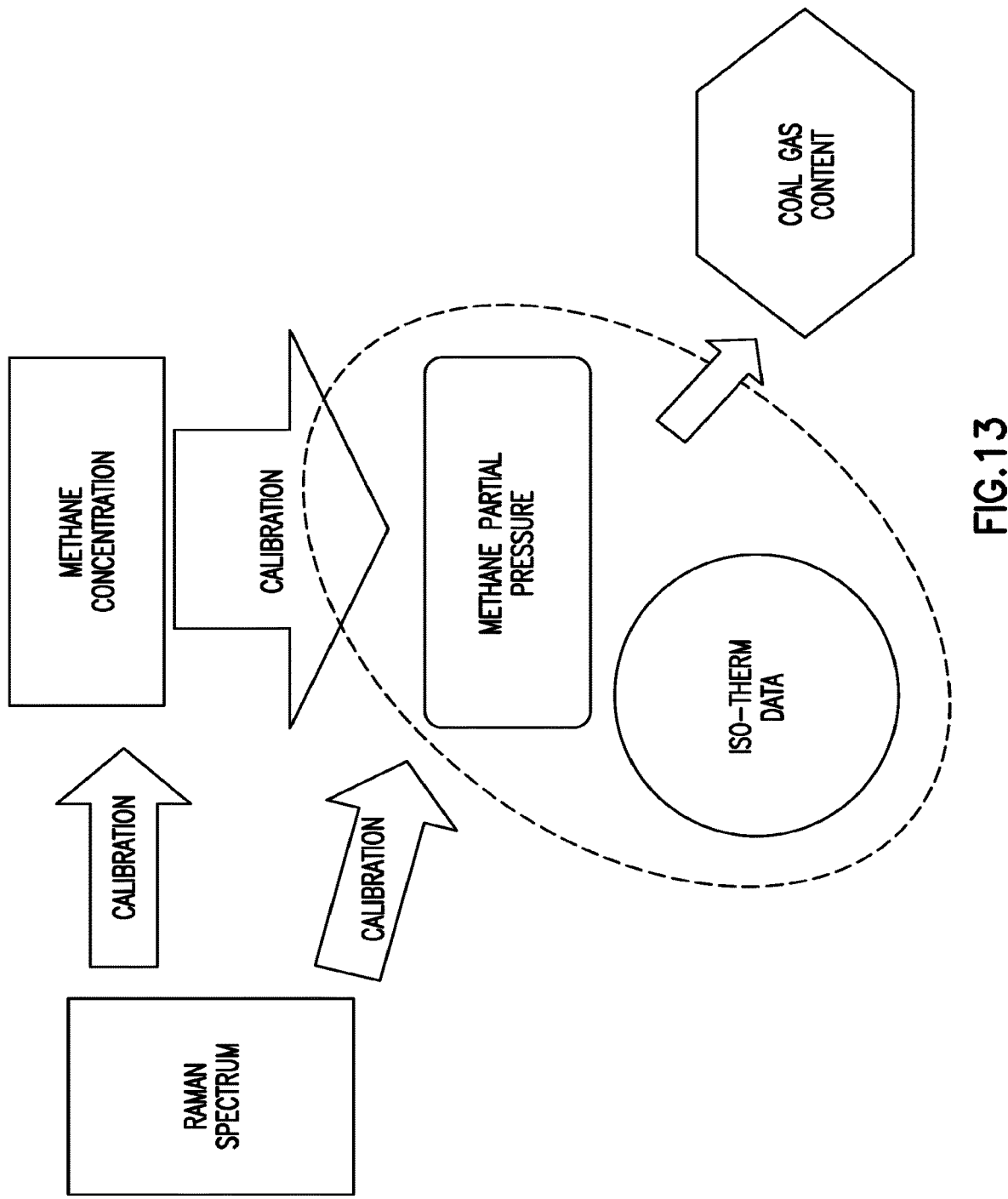
FIG. 13 is flowchart of a process of conversion of a Raman spectrum of coal bed fluid to a gas content consistent with at least one embodiment of the present disclosure.

An exemplary conversion process Alternatively, as also described elsewhere herein, the Raman spectra of a Raman spectrum of coal bed fluid to a gas content is summarized below and shown in FIG. 13.

Raman measurements are taken. Temperature, pressure, and conductivity are also measured or provided. In one embodiment and as described elsewhere herein, using this data the Raman spectra measurements are analyzed to determine methane concentration data, which are in turn analyzed to determine methane partial pressure data. Alternatively, as also described elsewhere herein, the Raman spectra can also in some instances be converted directly to the methane partial pressure data. The methane partial pressure data is then analyzed along with coal isotherm data to determine the coal gas content.

Working in reverse order, to calculate the gas content, the partial pressure of methane in the fluid surrounding the coal and the isotherm of the coal are provided. The isotherm is a correlation, at a given temperature, between the partial pressure of methane and the storage capacity of the coal, i.e. saturated methane gas content. The isotherm may be known or estimated externally to the Raman measurement. The Raman measurement may determine the partial pressure of methane in the fluid surrounding the coal.

To make the conversion between a Raman spectrum and methane partial pressure, the Raman spectrometer is calibrated. Samples of methane in equilibrium with water are constructed at various pressures. Raman spectra of the samples are taken. The pressures of the samples may then correlate with the range of methane partial pressures expected in the unknown samples.

The concentration of methane in each sample's fluid can be calculated by Henry's law, using an appropriate Henry's law constant for the given conditions, i.e. temperature, salinity and methane partial pressure, or by some other method that indicates the solubility of methane in water. This methane in fluid concentration may be correlated with the intensity of the methane peak in the Raman spectra of the sample. Alternately, the partial pressure of methane can also be directly correlated with the intensity of the methane peak in the Raman spectra.

With the above correlations, either methane concentration or partial pressure may be calculated by measuring the Raman spectrum of an unknown sample. Correlating to concentration and then to partial pressure provides the advantage that the relationship between concentration and Raman signal will not be affected by differences in the fluid quality. Subsequent conversion of methane concentration to partial pressure uses Henry's law and a Henry's law constant that is corrected for the unknown sample's temperature and salinity, which may be measured in a wellbore. The partial pressure of methane is calculated. The calculation of partial pressure of methane allows a direct reading from the isotherm to determine the gas content. Factors such as localized depressurization may be taken into account when determining the partial pressure.

In another embodiment, the steps to determine the partial pressure are based upon an optical measurement of the methane concentration to reach partial pressure. A calibration of Raman or other spectrometer counts are constructed that relates those counts to methane concentration dissolved in water. A methane partial pressure at a room temperature may be applied and the system allowed to come to equilibrium; in certain embodiments, equilibration may be accomplished for a pressure range that exceeds the range of interest in the well. The Raman signal from the methane in the ideal water sample may be measured and the methane concentration dissolved in that sample calculated. The methane concentration may be correlated with the methane partial pressure that was applied, using a Henry's law constant for water at room temperature. This process provides a calibration between Raman signal, concentration in the water and partial pressure of methane above the water at room temperature.

The Function is moles of $CH_4$/moles of water=Pressure[atm]*Henry's constant [mM] $CH_4$=Pressure[atm]*Henry's constant*55 moles of water/liter water*1000

The Raman spectra of the unknown well sample and its temperature and salinity may be recorded. From the Raman measurement and the calibration, a concentration of the methane in the well water may be calculated via computer or model. With the methane concentration and a value of the Henry's law constant for the particular well temperature and salinity, a methane equilibrium partial pressure may be calculated. Values of Henry's law constant for temperatures and salinities of interest are available in published literature, or may be measured. A relationship between saturated coal gas content at the reservoir temperature versus methane partial pressure may be obtained or generated, where the coal is in a saturated moisture state, i.e. at its equilibrium moisture content. This can be a general isotherm for the type of coal or for more accuracy, the exact coal from the well.

Using the equilibrium methane partial pressure for the well conditions (methane content, temperature and salinity), a gas content for the coal may be calculated from the isotherm. With a valid isotherm for the coal, the methane content of the coal can be determined from the isotherm with the partial pressure of methane. In another embodiment, a Langmuir or other type of isotherm model equation may be used to represent the true isotherm. The Langmuir and other model equations are equation versions of the isotherm. The gas content may be calculated from the Langmuir and other model equations. The accuracy of the values used for the Henry's law constant and the coal isotherm may have an effect on the accuracy of the calculations.

As described above, by measuring the partial pressure of methane or another indicative substance, or by correlating the concentration of methane to partial pressure, a production value may be obtained. The use of an ideal gas content curve or coal isotherm may be used to determine the coal gas content. A cutting or core sample of the coal may be used to determine the actual coal isotherm. However, an isotherm from a similar coal or coal type may be used as well as an isotherm which is representative of a coal, coal type, coal formation or coal basin/region. In such an instance, a library of coals may be compiled to allow automated determinations based on the coal. A range of values dependent on the isotherms may be used. Another example of automating the determination of the coal gas content is by using a model based upon equations.

A method of determining the gas content from the partial pressure of methane via an isotherm model for a wide range of coals is shown hereinbelow. In this model, the actual coal isotherm for the coal being measured need not be measured. However, to achieve a more accurate gas content an actual cutting or core and measurement of the coal may be accomplished to determine the isotherm for the specific coal bed.

The correlation may convert from Pm (methane partial pressure, which is obtained from the methane concentration and the appropriate value of the Henry's law constant) to G (coal gas content).

The Langmuir equation is:

$$\Theta/(1-\Theta)=Ka;$$

where $\Theta$ is fractional gas coverage or gas content (i.e. $\Theta=G/G_{sat}$ with $G_{sat}=G$ at saturation, in scf/ton), K is the binding constant for methane to the coal and a is thermodynamic activity, which is related to concentration and to "partial pressure of methane", $P_m$.

By analogy, a new Langmuir isotherm may be defined:

$$G_{sat}\{\Theta/1-\Theta\}=K_bP_m$$

where, $K_b$ is the binding constant for methane to the coal in scf/ton psi. This formulation has G approaching $G_{sat}$ as $P_m$ goes to infinity. Now, using $\Theta=G/G_{sat}$ $$G/\{1-(G/G_{sat})\}=K_bP_m;$$

$$G=K_bP_m-\{GK_bP_m/Gsat\};$$

$$G\{1+(K_bP_m/G_{sat})\}=K_bP_m$$

And finally, $$G=(K_bP_m)/\{1+(K_bP_m/G_{sat})\} \quad \text{Equation 2}$$

With this comes G (coal gas content) from $K_b$ and $P_m$. The linearized reciprocal equation is:

$$1/G=1/K_bP_m+1/G_{sat} \quad \text{Equation 3}$$

Figure 14:
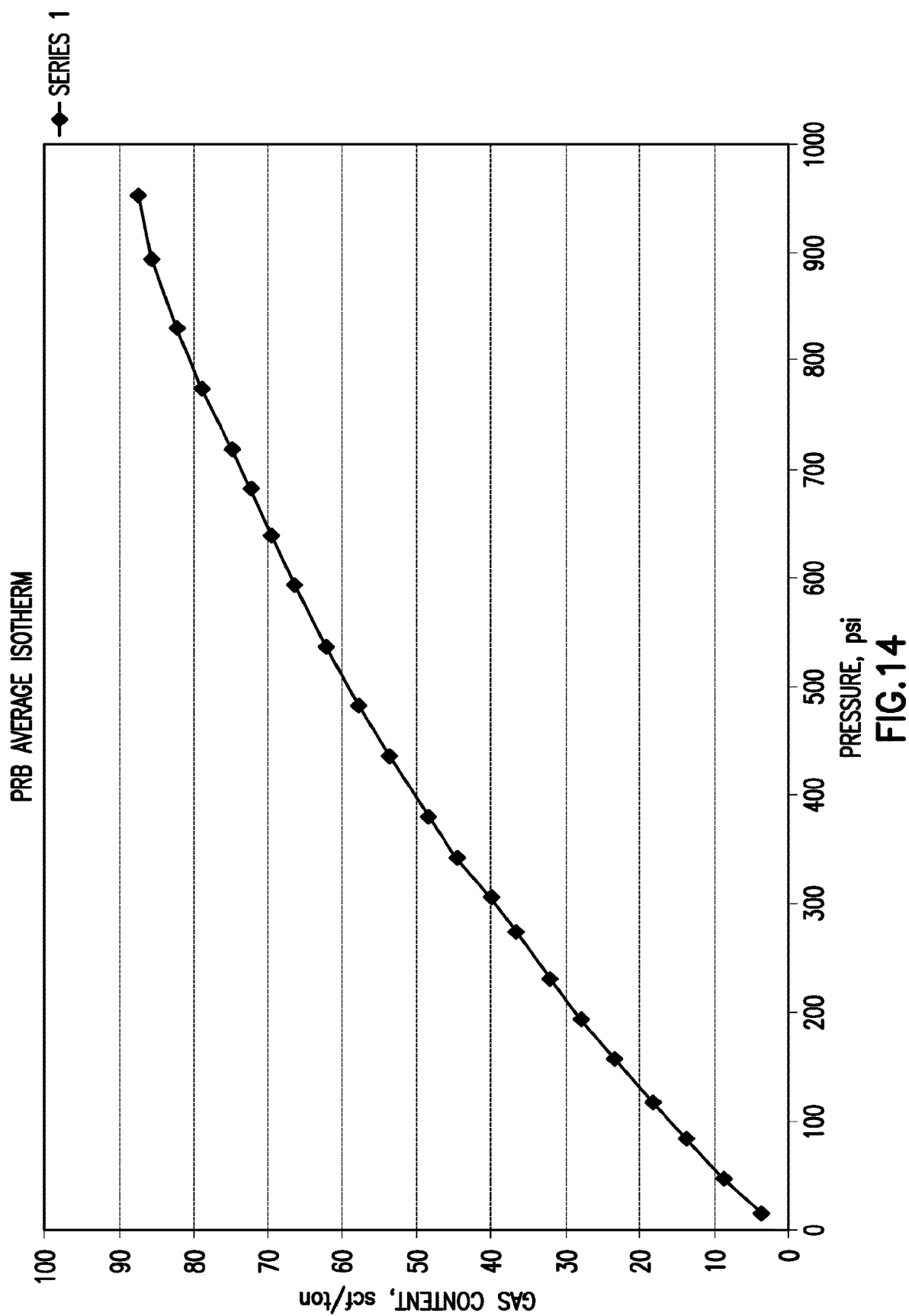
FIG. 14 is a graphical depiction of an averaged coal isotherm.

This linearized reciprocal equation was used to analyze the isotherm shown in FIG. 14 (i.e. plot 1/G versus 1/P, which gives $1/G_{sat}$ as the intercept and $1/K_b$ for the slope). This gives an R value of 0.99953. It gives $G_{sat}=178$ scf/ton and $K_b=0.175$ scf/ton psi.

Using Equation 2 above with these values, a value of $P_m$ may be determined and the corresponding value of G for coals obtained for which the typical isotherm in FIG. 14 is suitable. To predict the isotherm a bit more closely reiterations and other modifications can be done.

EXAMPLE

In the Example, a wellbore may penetrate two coal seams. The upper coal seam may have 0 psi of gas and 100 psi of water pressure. The lower coal seam may be 70.4 meters deeper than the upper coal seam and may have 100 psi of gas and 200 psi of water pressure. The permeability and thickness of the two coal seams may be the same. A submersible pump may be located below both coal seams. Because the upper coal seam has 0 psi of gas and 100 psi of water pressure, the upper coal seam will be 0% saturated in gas. Gas concentration is therefore 0 mM in the upper coal seam. As the lower coal seam has 100 psi of gas and 200 psi of water pressure, the lower coal seam is 50% saturated. Under these conditions the concentration of solubilized gas in the water occupying a coal cleat structure is 10 mM. Further, as the lower seam is 70.4 meters below the upper coal seam, the lower coal seam will have 100 psi of additional water head than the upper coal seam, and so that there is no crossflow between the two coal seams under steady state production conditions.

As the permeability and thickness of the two coals seams are the same, the fluid flow rates measured by the coal seam producibility determination system for each coal seam will be the same, provided the fluid level in the well is located above the upper coal seam at a first fluid level A. Consequently, the gas concentration of the commingled production measured by the Raman spectrometer at the wellhead will be 5 mM. The speed of the submersible pump may be increased to lower the fluid level in the wellbore to a steady position between the two coal seams at s second fluid level B.

After lowering the fluid level, there will be no hydrostatic head acting on the upper coal seam, with therefore a greater pressure drawdown applied to the upper coal seam than the lower coal seam. A higher fluid flow rate from the upper coal seam than the bottom seam may be achieved. If the drawdown applied to the upper coal seam is twice as high as the drawdown applied to the bottom coal seam, then the flow rate from the upper coal seam will be twice as high as the lower coal seam. Consequently, the gas concentration of the commingled production measured by the Raman spectrometer at the wellhead will drop to 2.5 mM. At the first level A, the DAS device is used to measure flow rates $Q_{1A}$ and $Q_{2A}$ from the upper and lower coal seams respectively, and a solution gas sensor, such as a Raman spectrometer, is used to measure the wellhead solubilized gas concentration $CH4_{tA}$ in the fluid produced by the submersible pump. The two flow rates $Q_{1A}$ and $Q_{2A}$ are summed to give total wellhead flow rate $Q_{tA}$. Values of $Q_{1A}$, $Q_{2A}$, $Q_{tA}$ and $CH4_{tA}$ are inserted into the form of equation 1 to create a first simultaneous equation A. At the second fluid level the DAS device is used to measure flow rates $Q_{1B}$ and $Q_{2B}$ from the upper and lower coal seams respectively, and a solution gas sensor, such as a Raman spectrometer, is used to measure the wellhead solubilized gas concentration $CH4_{tB}$ in the fluid produced by the submersible pump. The two flow rates $Q_{1B}$ and $Q_{2B}$ are summed to give total wellhead flow rate $Q_{tB}$. Values of $Q_{1B}$, $Q_{2B}$, $Q_{tB}$ and $CH4_{tB}$ are inserted into the form of equation 1 to create a second simultaneous equation B. Simultaneous equations A and B can be readily solved to determine $CH4_1$ and $CH4_2$, which are the solubilized gas concentrations in the fluid-filled clear structures of the upper and lower coal seams respectively.

Depending on the context, all references herein to the "disclosure" may in some cases refer to certain specific embodiments only. In other cases it may refer to subject matter recited in one or more, but not necessarily all, of the claims. While the foregoing is directed to embodiments, versions and examples of the present disclosure, which are included to enable a person of ordinary skill in the art to make and use the disclosures when the information in this patent is combined with available information and technology, the disclosures are not limited to only these particular versions and examples. Other and further embodiments, versions and examples of the disclosure may be devised without departing from the basic scope thereof and the scope thereof is determined by the claims that follow.

What is claimed is:

1. A method comprising:
   providing a coal seam producibility determination system, the coal seam producibility determination system comprising:
   a fiber optic cable, the fiber optic cable extending from a Distributed Acoustic Sensor (DAS) interrogation unit, the DAS interrogation unit located at a surface, into a wellbore, the wellbore intersecting a plurality of coal seams to be measured, the coal seams comprising fluid and solubilized gas, the wellbore containing wellbore fluid having an annulus fluid level, the wellbore having a wall, the fiber optic cable extending along the plurality of coal seams;
   a spectrometer, the spectrometer located at the surface or within the wellbore; and
   an optical window, the optical window in optical communication with the spectrometer, the optical window in fluid communication with the wellbore fluid;
   holding the annulus fluid level at a constant level at a first fluid height by removing wellbore fluid from the wellbore, the constant level above a level of a highest coal seam;
   determining an initial flow rate corresponding to a rate at which wellbore fluid is removed from the wellbore; and
   measuring a common depth point (CDP), a gas content, and a gas saturation value for wellbore fluid removed from the wellbore at the constant level.

2. The method of claim 1, further comprising;
   lowering the annulus fluid level to a second height, the second height below the level of the highest coal seam, but above a level of a second highest coal seam;
   determining a second flow rate corresponding to the rate at which wellbore fluid is removed from the wellbore; and
   measuring the CDP, gas content, and gas saturation value for wellbore fluid removed from the wellbore at a second level.

3. The method of claim 2 further comprising determining a gas concentration of each of the plurality of coal seams.

4. The method of claim 3, wherein the step of determining the gas concentration of each of the plurality of coal seams is solved using a series of linear equations having the form of:

$Q_t*CH4_T = Q_1*CH4_1 + Q_2*CH4_2 + Q_3*CH4_3 \ldots Q_n*CH4_n$

Where:
   $Q_t$=total flow rate (which is sum of the flow rates from all coal seams1 to n expressed as Q1 to Qn)
   $Q_n$=measured flow rate from nth coal seam (using DAS)
   CH4T=measured solution gas concentration in comingled flow at wellhead (using Raman spectrometer); and
   CH4n=unknown solution gas concentration in the nth coal seam.

5. The method of claim 4, wherein the series of linear equations is solved by elimination of variables or row reduction.

6. The method of claim 4 further comprising determining coal seam gas reserves of the coal seams to be measured.

7. The method of claim 1, wherein the step of determining an initial flow rate corresponding to the rate at which wellbore fluid is removed from the wellbore comprises analyzing back-scattered light transmitted through the fiber optic cable to the DAS interrogation unit.

8. The method of claim 1, further comprising determining a wellbore pressure.

9. The method of claim 1, further comprising providing a submersible pump and wherein the initial flow rate is controlled by a speed of the submersible pump.

* * * * *